(12) United States Patent
Ki et al.

(10) Patent No.: US 9,964,360 B2
(45) Date of Patent: May 8, 2018

(54) METHOD OF MANUFACTURING A SLAG DISCHARGE DOOR

(71) Applicants: Hyundai Steel Company, Incheon (KR); Seoul Engineering Co., Ltd., Incheon (KR)

(72) Inventors: Joon-Seong Ki, Incheon (KR); Hae-Yang Lee, Incheon (KR); Jin-Ill Hwang, Incheon (KR)

(73) Assignees: Hyundai Steel Company, Incheon (KR); Seoul Engineering Co., Ltd., Incheon (KR)

( * ) Notice: Subject to any disclaimer, the term of this patent is extended or adjusted under 35 U.S.C. 154(b) by 296 days.

(21) Appl. No.: 14/096,834

(22) Filed: Dec. 4, 2013

(65) Prior Publication Data
US 2014/0290026 A1 Oct. 2, 2014

Related U.S. Application Data

(63) Continuation of application No. PCT/KR2012/007636, filed on Sep. 24, 2012.

(30) Foreign Application Priority Data

Sep. 30, 2011 (KR) .................. 10-2011-0100005

(51) Int. Cl.
*F27D 1/18* (2006.01)
*F27D 1/12* (2006.01)
(Continued)

(52) U.S. Cl.
CPC .......... *F27D 1/1858* (2013.01); *C21C 5/5294* (2013.01); *F27B 3/085* (2013.01);
(Continued)

(58) Field of Classification Search
CPC .......... B21K 1/00; B21K 23/00; B23P 11/00; C21B 7/10; F27B 3/19; F27B 3/08;
(Continued)

(56) References Cited

U.S. PATENT DOCUMENTS 4,015,834 A * 4/1977 Wunsche .................. F27B 3/12
266/275
4,122,295 A * 10/1978 Nanjyo ..................... F27B 3/12
373/76
(Continued)

FOREIGN PATENT DOCUMENTS

GB 2064079 A * 6/1981 ............... C21B 7/10
JP 06-235590 8/1994
(Continued)

*Primary Examiner* — Christopher Besler
*Assistant Examiner* — Matthew P Travers
(74) *Attorney, Agent, or Firm* — Mintz Levin Cohn Ferris Glovsky and Popeo, P.C.; Kongsik Kim; Carolina Säve (57) ABSTRACT

The present invention relates to a method of manufacturing a slag discharge door, which is provided separately from a molten-steel discharge opening in an electric furnace and opens and closes a slag discharge opening for discharging slag. The method of manufacturing the slag discharge door, which moves up and down on the slag discharge opening to open and close the slag discharge opening, includes the steps of: forming a door body by forging, forming a coolant passage, a coolant inlet, and a coolant outlet in the door body by drilling, and then finishing a passage that blocks a portion that is open toward an outer surface of the door body.

8 Claims, 10 Drawing Sheets

(51) Int. Cl.
  *F27D 9/00* (2006.01)
  *F27D 3/15* (2006.01)
  *F27B 3/19* (2006.01)
  *F27B 3/08* (2006.01)
  *C21C 5/52* (2006.01)
  *F27D 17/00* (2006.01)
  *C21B 7/10* (2006.01)

(52) U.S. Cl.
  CPC .............. *F27B 3/19* (2013.01); *F27D 1/12* (2013.01); *F27D 1/18* (2013.01); *F27D 1/1816* (2013.01); *F27D 3/1545* (2013.01); *F27D 9/00* (2013.01); *F27D 17/004* (2013.01); *C21B 7/10* (2013.01); *C21C 5/5211* (2013.01); *F27D 3/159* (2013.01); *F27D 2009/0021* (2013.01); *Y02P 10/216* (2015.11); *Y10T 29/49826* (2015.01); *Y10T 29/49982* (2015.01); *Y10T 29/49996* (2015.01)

(58) Field of Classification Search
  CPC ........ F27B 3/085; F27B 14/06; F27B 14/061; F27D 1/12; F27D 1/1858; F27D 3/1545; F27D 3/1554; F27D 3/159; F27D 2009/0048; F27D 2009/0013; F27D 2009/0018–2009/0035; F27D 2009/0062; F27D 2009/0067; Y10T 29/49359; Y10T 29/49389; Y10T 29/49982; Y10T 29/49995; Y10T 29/49996

See application file for complete search history.

(56) References Cited

U.S. PATENT DOCUMENTS

| | | | |
|---|---|---|---|
| 5,650,119 A | 7/1997 | Hille et al. | |
| 2011/0227262 A1* | 9/2011 | Shver | C21C 5/5217 266/45 |
| 2012/0139170 A1* | 6/2012 | Ki | F27B 3/08 266/200 |

FOREIGN PATENT DOCUMENTS

| | | | |
|---|---|---|---|
| JP | 08-269510 | 10/1996 | |
| JP | 09-133475 | 5/1997 | |
| JP | 10-316479 A | 12/1998 | |
| JP | 10-317052 A | 12/1998 | |
| JP | 2009-541697 A | 11/2009 | |
| JP | 3156596 U | 12/2009 | |
| KR | 1999-0038390 | 10/1999 | |
| KR | 20-0250763 | 12/2001 | |
| KR | 10-2008-0098113 A | 11/2008 | |
| KR | 10-2010-0046844 A | 5/2010 | |
| KR | 10-2010-0065849 A | 6/2010 | |
| KR | WO 2011081266 A1 * | 7/2011 | ............... F27B 3/08 |

* cited by examiner

METHOD OF MANUFACTURING A SLAG DISCHARGE DOOR

CROSS-REFERENCE TO RELATED APPLICATIONS

This application is a continuation of International Application No. PCT/KR2012/007636, filed on Sep. 24, 2012, which claims priority to Korean Application No.: 10-2011-0100005 filed on Sep. 30, 2011, which applications are incorporated herein by reference.

TECHNICAL FIELD

The present invention relates generally to a method of manufacturing a slag discharge door and, more particularly, to a method of manufacturing a slag discharge door, capable of efficiently manufacturing a slag discharge door that prevents initial slag from leaking from a slag discharge opening of the electric furnace.

The present application claims the benefit of Korean Patent Application No. 10-2011-0100005, filed on Sep. 30, 2011, the contents of which are entirely incorporated herein by reference.

BACKGROUND ART

Generally, an electric furnace refers to a furnace that heats and melts metal or alloy using electric energy. After scrap is charged into the furnace, current in an arc form is produced between an electrode and the scrap to heat and thereby melt the scrap.

Further, impurities in the scrap are molten during steel-making work of the electric furnace, thus causing slag in the form of oxide to be formed on molten steel.

The slag floats on the surface of the molten steel, prevents the surface of the molten steel from being oxidized by air and serves to preserve the surface. On an interface between the slag and the molten steel, mass transfer and chemical reactions occur.

DISCLOSURE

Technical Problem

Accordingly, the present invention has been made keeping in mind the above problems occurring in the prior art, and an object of the present invention is to provide a method of manufacturing a slag discharge door for an electric furnace, which has excellent cooling performance, thus preventing the slag discharge door from being deformed due to high temperature, when the slag discharge door comes into contact with slag.

Technical Solution

In order to accomplish the above object, the present invention provides a method of manufacturing a slag discharge door for opening or closing a slag discharge opening in an electric furnace that has a molten-steel discharge opening for discharging molten steel, and the slag discharge opening provided separately from the molten-steel discharge opening to discharge slag, the method including:

a body forming step of forming a door body of the slag discharge door;

a coolant-passage forming step of forming a coolant passage, a coolant inlet, and a coolant outlet by drilling into the door body formed at the body forming step; and a passage closing step of closing an open portion of the coolant passage formed at the coolant-passage forming step, the open portion being open to an outside of the door body.

Advantageous Effects

As described above, the present invention provides a method of manufacturing a slag discharge door for an electric furnace, which effectively dissipates heat from slag in the case of blocking the leakage of slag, thus minimizing deformation and damage due to the heat and thereby ensuring good durability and long service life, therefore allowing the slag discharge door to be stably used for a lengthy period of time.

DESCRIPTION OF REFERENCE CHARACTERS OF IMPORTANT PARTS

10: door body
20: door reinforcing body
30: coolant passage
40: passage stopper
50: side stopper
60: high-hardness coating layer
100: body forming step
200: coolant-passage forming step
300: passage closing step
400: surface treating step
500: reinforcement manufacturing step
600: door assembling step

BEST MODE

The preferred embodiments of the present invention will be described in detail with reference to the accompanying drawings.

Figure 1:
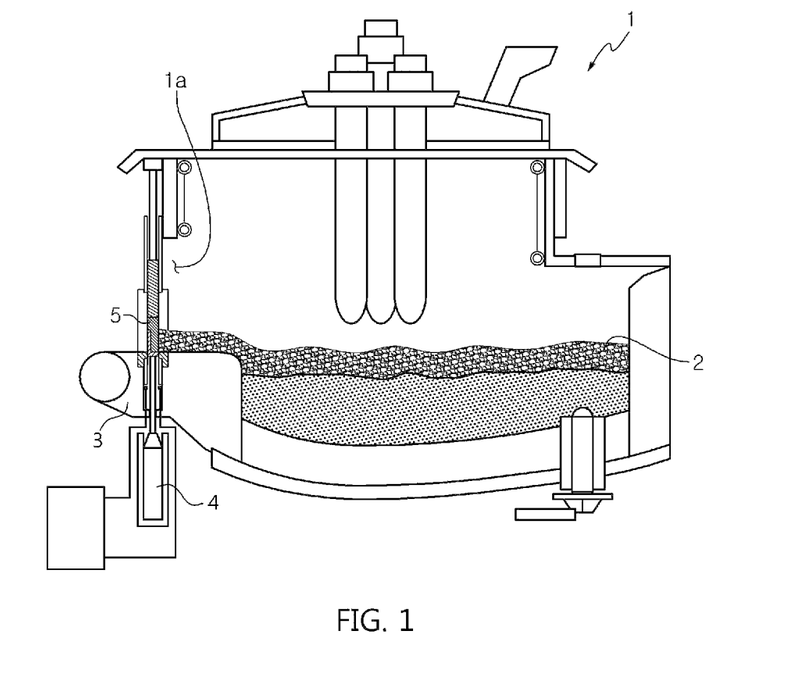
FIG. 1 is a schematic view illustrating an example wherein a slag discharge door for an electric furnace according to the present invention is mounted to the electric furnace.

Referring to FIG. 1, a method of manufacturing a slag discharge door for an electric furnace 1 according to the present invention is directed to a method of manufacturing a door main body 5 that is mounted to a slag discharge opening 1a of the electric furnace 1 to open or close the slag discharge opening 1a. The electric furnace 1 is provided with a molten-steel discharge opening (not shown) through which molten steel is discharged, separately from the slag discharge opening 1a. According to the present invention, the slag discharge opening 1a is formed separately from the molten-steel discharge opening (not shown) through which the molten steel in the electric furnace 1 is discharged, thus discharging only slag formed on the surface of the molten steel.

As an example, the door main body 5 is provided on a bottom of the slag discharge opening 1a of the electric furnace 1 in such a way as to move up and down, thus opening or closing the slag discharge opening 1a.

The slag discharge opening 1a is formed at a predetermined position of the electric furnace 1, separately from the molten-steel discharge opening for discharging the molten steel from the electric furnace 1, and serves to discharge slag 2 that is produced in the electric furnace 1 during steelmaking work.

The door main body 5 is provided on the slag discharge opening 1a and is inserted into a slag-discharge-guide support member 3 for guiding the discharge of the slag 2 to be moved up and down by a door actuating device 4, thus controlling the discharge of the slag 2.

As an example, the door actuating device 4 utilizes a hydraulic cylinder or pneumatic cylinder having a piston rod that is connected to a lower surface of the door main body 5, or utilizes an electric motor to convert a rotating force of the electric motor into rectilinear movement and thereby perform an actuation.

One door actuating device 4 or a plurality of door actuating devices 4 may be provided.

Although the hydraulic cylinder, pneumatic cylinder and electric motor are different from each other in shape or actuating manner, all of them serve to actuate the door main body 5. Thus, they are referred to as the hydraulic cylinder hereinafter.

The hydraulic cylinder moves the piston rod by controlling hydraulic pressure supplied into the cylinder, thus moving the door main body 5 up and down.

The door main body 5 is situated to protrude upwards from the slag-discharge-guide support member 3 during the work of the electric furnace 1, so that an inner surface of the door main body is in direct contact with the slag 2, thus preventing the leakage of the slag 2. When the door main body moves down, an upper surface thereof is located on a level with an upper surface of the slag-discharge-guide support member 3, thus discharging the slag 2. The inner surface designates a front surface that is disposed in the electric furnace 1.

The door main body 5 includes a door body 10 defining a coolant passage 30 therein, with the coolant passage 30 passing through the door main body.

Figure 2:
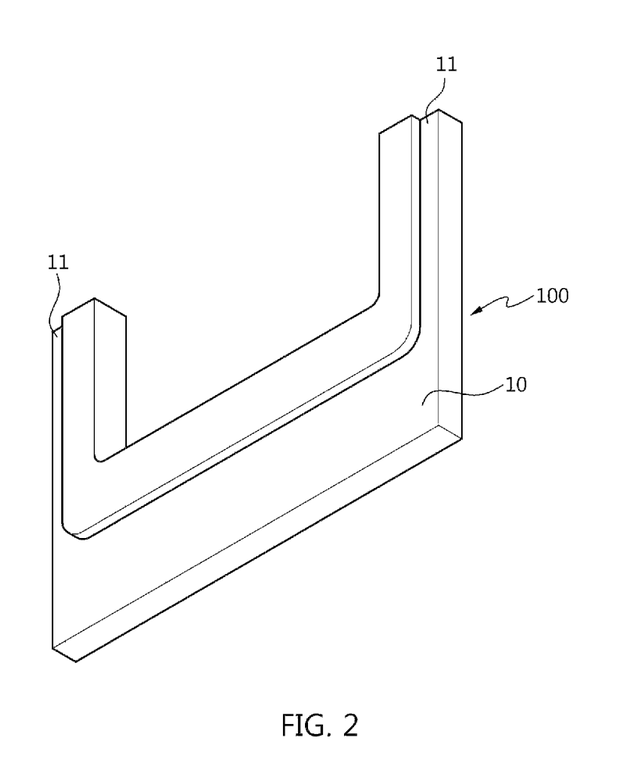
FIGS. 2 to 4 are views illustrating a method of manufacturing a slag discharge door for an electric furnace according to the present invention.

Referring to FIG. 2, the method of manufacturing the slag discharge door for the electric furnace 1 according to the present invention includes a body forming step 100 of forming the door body 10 by forging. At the body forming step 100, a product made of a metal material having high heat conductivity is formed into the door body 10 having a rectangular shape by forging.

The door body 10 uses metal or alloy having heat conductivity (kcal/° C.) of 250 or higher. The door body is preferably formed of copper that is inexpensive and high in heat conductivity, or alloy material containing the copper.

The body forming step 100 preferably uses forging, but may use casting.

At the body forming step 100, the door body 10 is preferably formed in such a way that guide protrusions 11 protrude from both sides of an upper portion of the rectangular body. Since the door body 10 is formed by forging, a structure becomes compact and the door body is strong and rigid.

Between the guide protrusions 11, the slag in the electric furnace passes. The guide protrusions prevent the slag from leaking through both side ends of the door body 10, thus allowing the slag to be stably discharged through the slag discharge opening.

Further, facing surfaces of the guide protrusion 11, namely, inner surfaces of the guide protrusion 11 are surfaces that are in contact with the slag.

Figure 3:
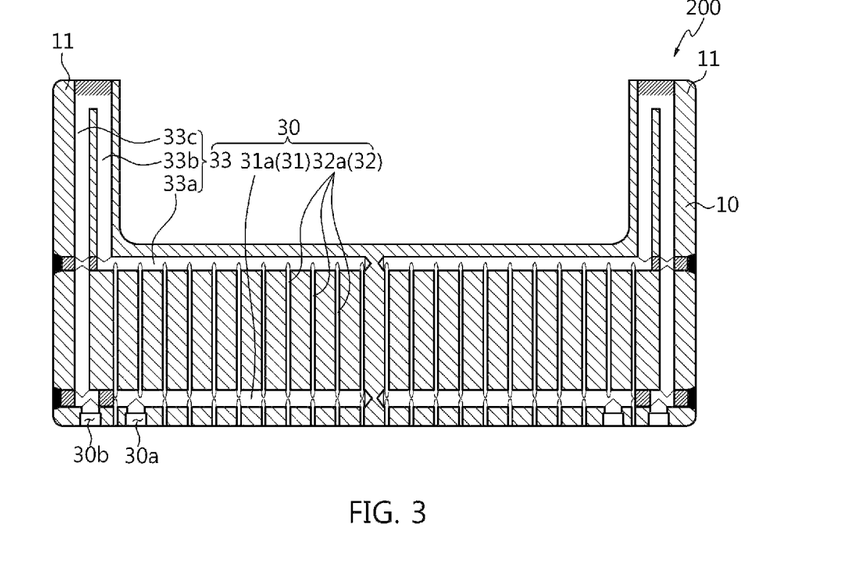

Referring to FIG. 3, after the body forming step 100, a coolant-passage forming step 200 is performed to form the coolant passage 30, a coolant inlet 30a, and a coolant outlet 30b in the door body 10.

At the coolant-passage forming step 200, the door body 10 is drilled using a drill, thus forming the coolant passage 30 through which coolant passes, the coolant inlet 30a through which the coolant is introduced into the coolant passage 30, and the coolant outlet 30b through which the coolant passing through the coolant passage 30 is discharged.

The coolant passage 30 includes a plurality of horizontal and vertical passages to allow the door body 10 to be evenly cooled. At the coolant-passage forming step 200, the plurality of horizontal and vertical passages is formed by drilling. Hence, each passage is formed to be open towards an outside of the door body 10.

At the coolant-passage forming step 200, a pair of coolant passages 30 each having the coolant inlet 30a and the coolant outlet 30b is provided on both sides of the door body 10 to separately cool respective portions of the door body 10 by the independent coolant passages 30, thus increasing the cooling efficiency of the door body 10.

Figure 4:
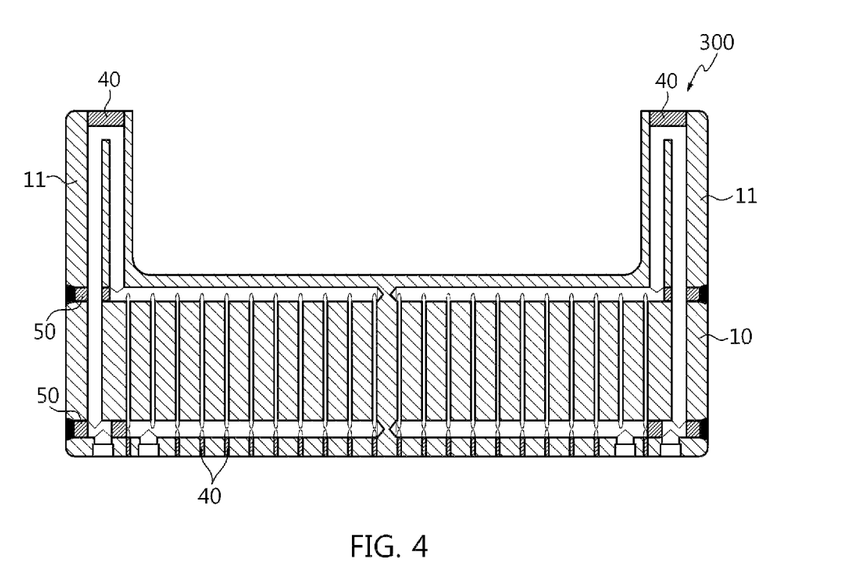
Figure 5:
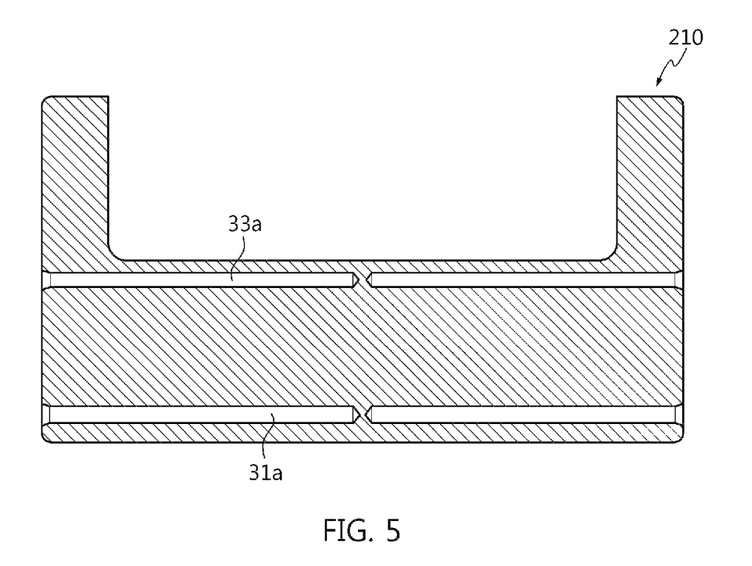
FIGS. 5 to 9 are views illustrating a step of forming a coolant passage in the method of manufacturing the slag discharge door for the electric furnace according to the present invention.
Figure 6:
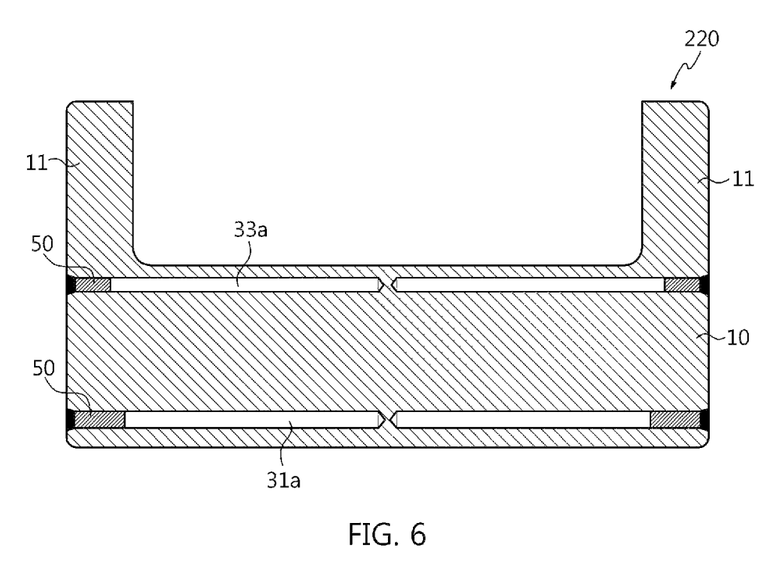
Figure 7:
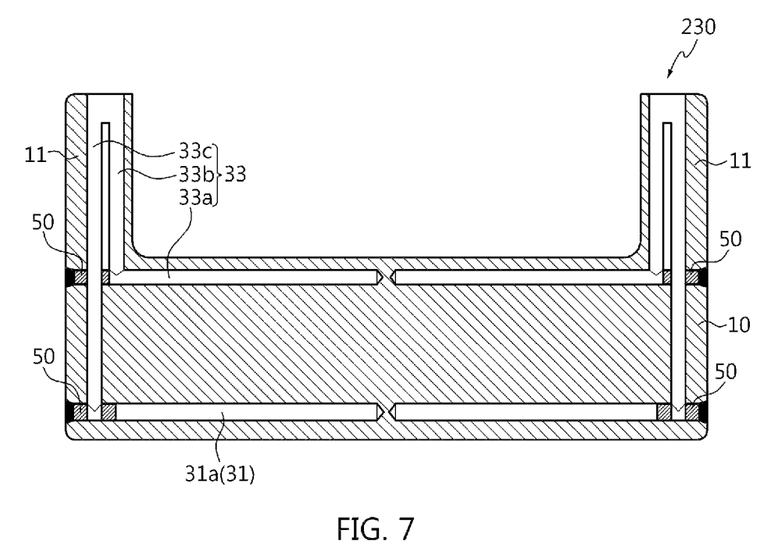
Figure 8:
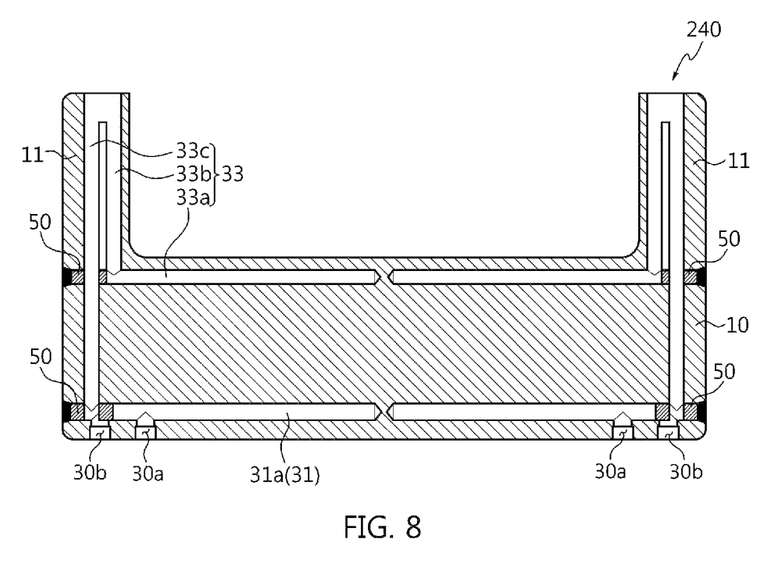
Figure 9:
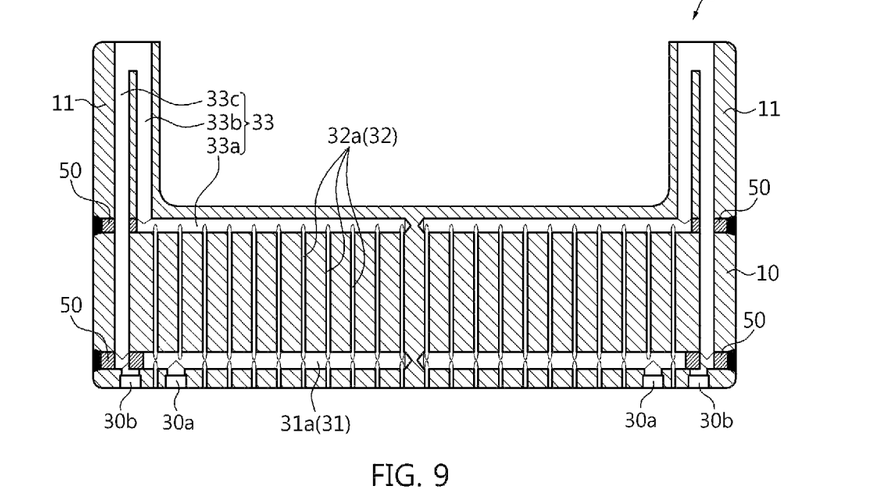

Referring to FIG. 4, except for the coolant inlet 30a and the coolant outlet 30b of the coolant passage 30 formed at the coolant-passage forming step 200, portions of the door body 10 that are opened to the outside are closed at a passage closing step 300.

At the passage closing step 300, a passage stopper 40 is inserted into a portion of the coolant passage 30 formed at the coolant-passage forming step 200, which is open to the outside of the door body 10, and the passage stopper 40 is securely welded to the door body 10, thus closing the portion of the coolant passage 30 that is open to the outside of the door body 10.

Preferably, the passage stopper 40 is made of the same metal material as the door body 10.

At the passage closing step 300, portions of the coolant passage 30 other than the coolant inlet 30a and the coolant outlet 30b are closed, thus allowing coolant introduced into the coolant passage 30 via the coolant inlet 30a to be discharged to the coolant outlet 30b and circulated without leaking to the outside.

On one hand, referring to FIGS. 3 and 4, the coolant passage 30 includes a coolant inflow pipe 31 into which the coolant is introduced;

a plurality of coolant branch pipes 32 which are connected to the coolant inflow pipe 31 and are spaced apart from each other, thus causing the coolant fed from the coolant inflow pipe 31 to pass; and a coolant discharge pipe 33 which is connected to an outlet of each coolant branch pipe 32.

Further, an example of the coolant passage 30 is as follows. The coolant inflow pipe 31 is a lower horizontal inflow pipe 31a that is provided on a lower portion of the door body 10 in such a way as to be horizontally disposed. The coolant branch pipes 32 are a plurality of vertical branch pipes 32a which are vertically set up in such a way as to be spaced apart from each other, and are connected at lower ends thereof to the lower horizontal inflow pipe 31a. The coolant discharge pipe 33 may include an upper horizontal discharge pipe 33a that is provided on an upper portion of the door body 10 in such a way as to be horizontally disposed and is connected to an upper end of each vertical branch pipe 32a, a first side vertical discharge pipe 33b that is connected to the upper horizontal discharge pipe 33a and is vertically set up on a side of the door body 10 to move the coolant upwards, and a second side vertical discharge pipe 33c that is connected to the first side vertical discharge pipe 33b to discharge the coolant downwards.

Referring to FIGS. 5 to 9, the coolant-passage forming step 200 includes a first passage forming operation 210, a passage blocking operation 220, a second passage forming operation 230, a coolant entrance forming operation 240, and a third passage forming operation 250. At the first passage forming operation 210, by horizontally drilling a side of the door body 10, the lower horizontal inflow pipe 31a horizontally disposed on the lower portion of the door body 10 and the upper horizontal discharge pipe 33a horizontally disposed on the upper portion of the door body 10 are formed.

At the passage blocking operation 220, the side stopper 50 is inserted into a portion of each of the lower horizontal inflow pipe 31a and the upper horizontal discharge pipe 33a, which is open to a side of the door body 10, thus blocking the open portion.

At the second passage forming operation 230, by downwardly drilling the upper surface of the guide protrusion 11, there are formed the first side vertical discharge pipe 33b that is disposed vertically and is connected at the lower end thereof to the upper horizontal discharge pipe 33a, and the second side vertical discharge pipe 33c that is vertically disposed in the guide protrusion 11 in such a way as to be spaced apart from the first side vertical discharge pipe 33b and extends at the lower end thereof to the lower horizontal inflow pipe 31a. At the upper end of the guide protrusion 11, the first and second side vertical discharge pipes 33b and 33c are connected to each other.

At the coolant entrance forming operation 240, by upwardly drilling the lower surface of the door body 10, the coolant outlet 30b communicating with the second side vertical discharge pipe 33c and the coolant inlet 30a communicating with the lower horizontal inflow pipe 31a are formed.

At the third passage forming operation 250, by upwardly drilling the lower surface of the door body 10, the plurality of vertical branch pipes 32a is formed in such a way as to be spaced apart from each other, each vertical branch pipe passing through the lower horizontal inflow pipe 31a and being connected at an upper end thereof to the upper horizontal discharge pipe 33a.

At the second passage forming operation 230, the second side vertical discharge pipe 33c is formed to pass through the side stopper 50 of the upper horizontal discharge pipe 33a.

In this case, at the passage closing step 300, the passage stopper 40 is inserted into an upper portion of the guide protrusion 11 that is open to define a passage which connects the first and second side vertical discharge pipes 33b and 33c to each other at the second passage forming operation 230.

Further, at the passage closing step 300, the passage stopper 40 is inserted into the lower end of each of the vertical branch pipes 32a, namely, a hole located below the lower horizontal inflow pipe 31a when forming the vertical branch pipes 32a, thus closing the hole.

In the coolant passage 30 formed as described above, the coolant is introduced via the coolant inlet 30a into the lower horizontal inflow pipe 31a.

The coolant is primarily introduced into the lower horizontal inflow pipe 31a to fill the lower horizontal inflow pipe 31a. After the lower horizontal inflow pipe 31a is filled, almost simultaneously, the coolant is supplied to the plurality of vertical branch pipes 32a and flows through the vertical branch pipes 32a into the upper horizontal discharge pipe 33a. Further, the coolant is circulated in the manner of being discharged from the upper horizontal discharge pipe 33a through the first and second side vertical discharge pipes 33b and 33c, thus rapidly and uniformly cooling the door body 10.

Figure 10:
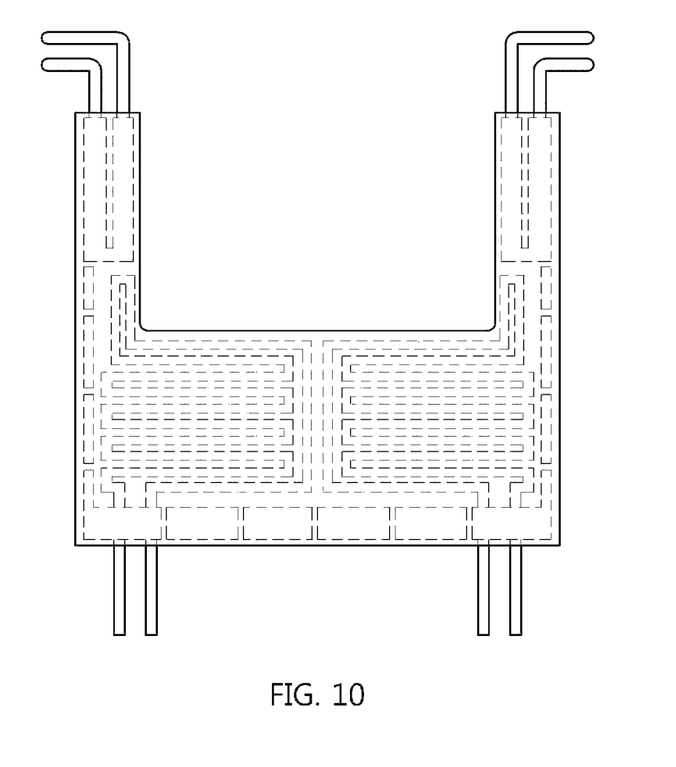
FIG. 10 is a view illustrating a comparative example of the present invention.

Referring to FIG. 10, according to the comparative example, two coolant lines are provided in the door body 10 in such a way as to be arranged in a zigzag fashion, each coolant line being formed by a single pipe.

Figure 11:
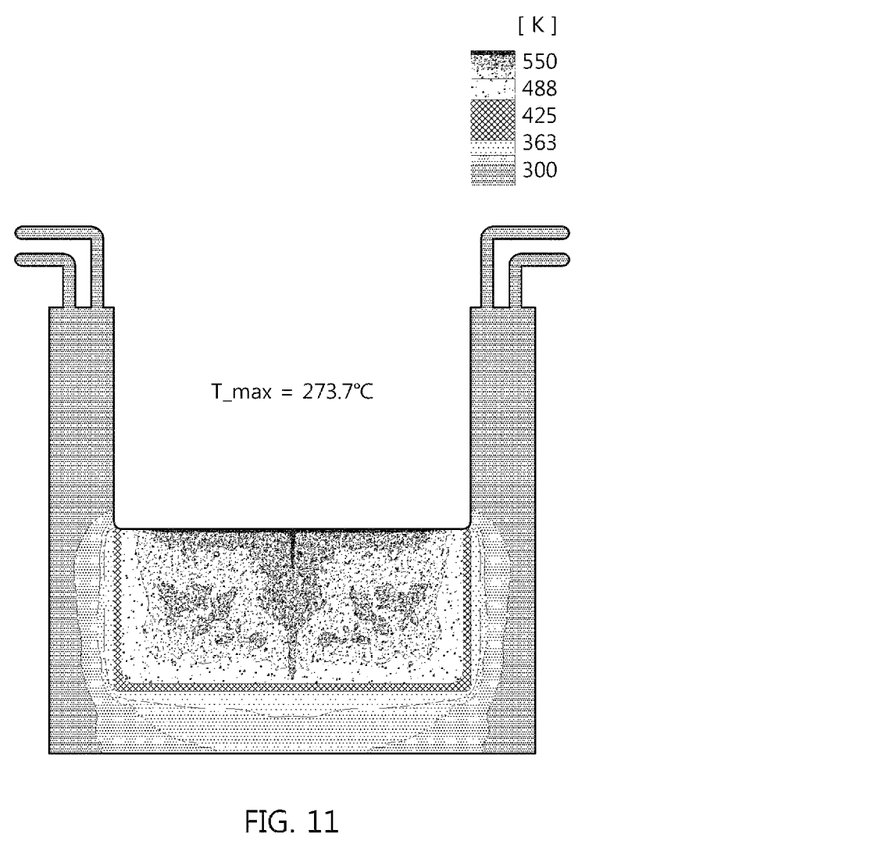
FIG. 11 is a diagram analyzing a heat distribution state on a front surface of a door body when simulating the comparative example of the present invention.

Referring to FIG. 11, as an example, coolant is supplied into the coolant line of the comparative example at 11 m³/h. This is a diagram showing the result of analyzing a heat distribution state on the front surface of the door body 10 when the door body of the comparative example is simulated under the same conditions that the front surface of the door body 10 is in contact with the slag of the electric furnace.

The analysis of the heat distribution is simulated with a simulation program for the heat distribution analysis. FIG. 11 is a grayscale diagram outputting, with a monitor, the heat distribution for the front surface of the door body according to the comparative example, when simulated using the simulation program.

As for the comparative example, it can be seen that the maximum temperature of the door body is 273.7° C. Since the temperature is close to 300° C., there is an increased danger that the door body may be deformed.

Figure 12:
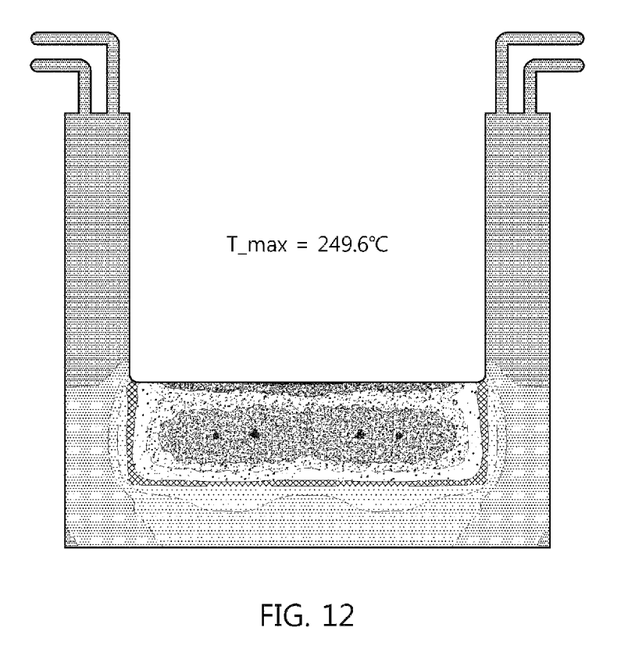
FIG. 12 is a diagram analyzing a heat distribution state on a front surface of a door body when simulating the door body of the slag discharge door for the electric furnace according to the present invention.

FIG. 12 is a diagram of analyzing a heat distribution state on the front surface of the door body 10 when the door body 10 illustrated in FIG. 2 is simulated under the same conditions as the comparative example. FIG. 12 is a grayscale diagram outputting, with the monitor, the heat distribution for the front surface of the door body according to the present invention, when simulated using the simulation program. Referring to FIG. 12, under the same conditions as the comparative example, it can be seen that the maximum temperature of the door body 10 according to the present invention of FIG. 2 is 249.6° C.

Figure 13:
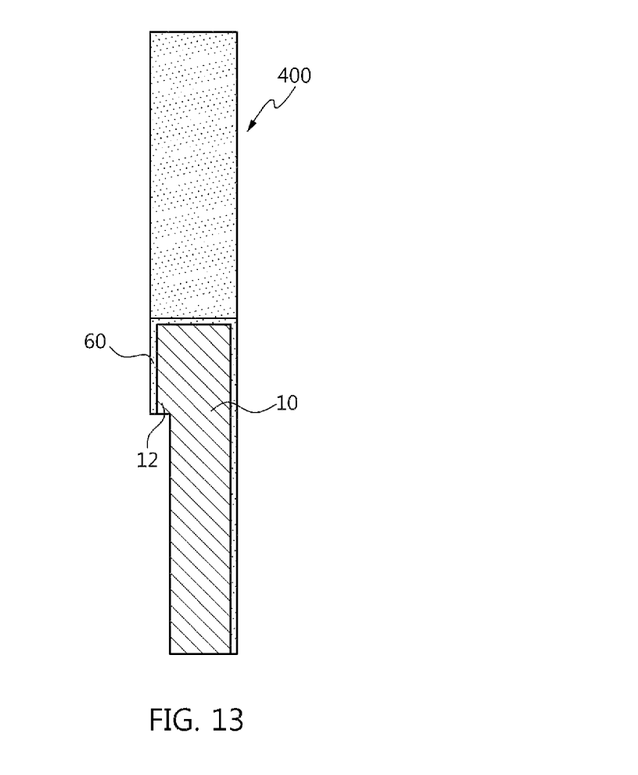
FIG. 13 is a sectional view of a door main body that is subjected to a step of forming a high-hardness coating layer in the method of manufacturing the slag discharge door for the electric furnace according to the present invention.

Referring to FIG. 13, preferably, the method of manufacturing the slag discharge door for the electric furnace according to the present invention further includes a surface treating step 400 of forming a high-hardness coating layer 60 on a slag contact surface of the door body 10 which is in contact with the slag.

The slag contact surface includes the front surface of the door body 10 disposed towards the inside of the electric furnace, and the inner surface of the guide protrusion 11 through which the slag of the electric furnace passes.

The high-hardness coating layer 60 is based on Fe—Cr coating, and other variants of forming high hardness coating are possible. The high-hardness coating layer 60 makes it easy to remove solidified slag 3, and minimizes abrasion on the slag contact surface as the cooled slag 3 is removed.

The surface treating step 400 includes a welding coating operation of coating the high-hardness coating layer 60 on the slag contact surface of the door body 10 by welding; and a surface grinding operation of grinding the high-hardness coating layer 60 formed at the welding coating operation.

Preferably, the surface treating step 400 further includes a preheating operation of preheating the door body 10, prior to the welding coating operation. The preheating operation preheats the door body 10 prior to the welding coating operation, thus allowing the coating layer to be more firmly fused on the surface of the door body 10 in the welding coating operation.

At the surface treating step 400, the high-hardness coating layer 60 having the irregular and uneven surface by the welding coating operation is ground and smoothened by the surface grinding operation.

At the surface treating step 400, it is possible to form the high-hardness coating layer 60 either by metalizing or plating.

Figure 14:
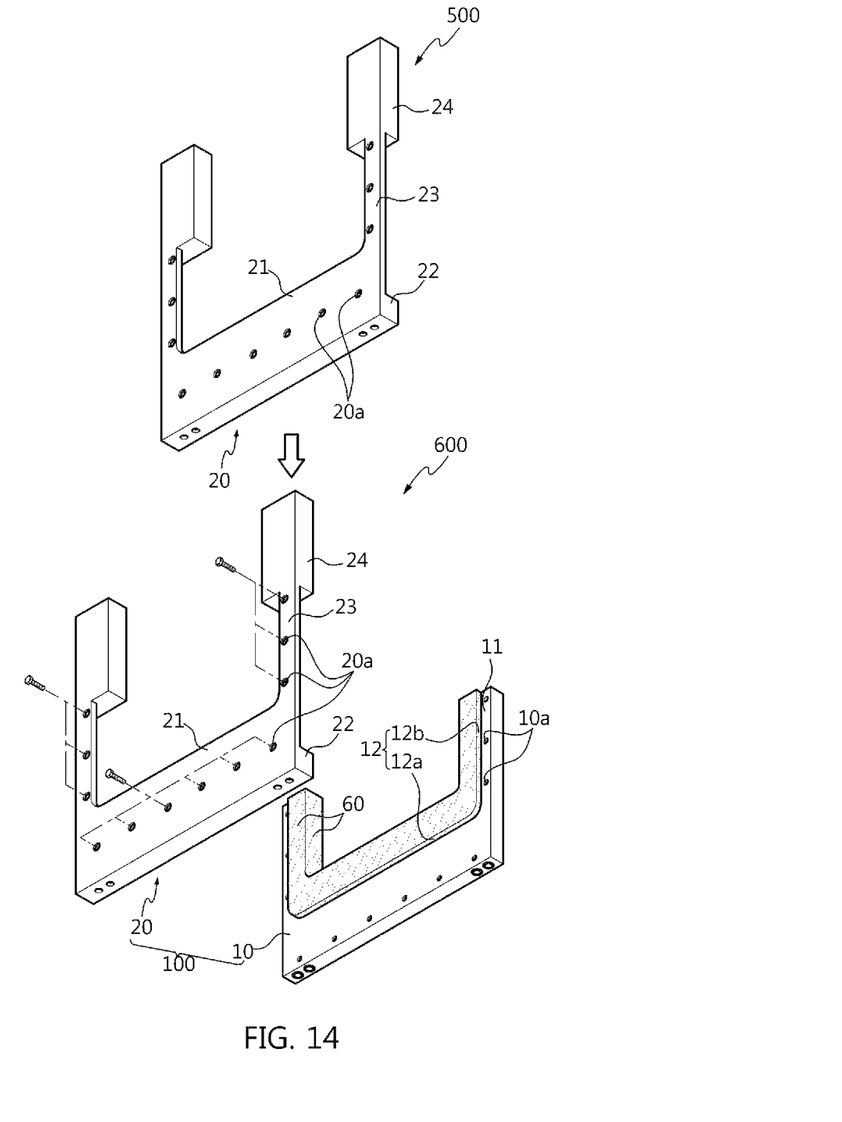
FIG. 14 is a view illustrating a step of forming a reinforcing door and a step of assembling the reinforcing door in the method of manufacturing the slag discharge door for the electric furnace according to the present invention.

Referring to FIG. 14, preferably, the method of manufacturing the slag discharge door for the electric furnace 1 according to the present invention further includes a reinforcement manufacturing step 500 and a door assembling step 600. At the reinforcement manufacturing step 500, a door reinforcing body 20 is formed to be coupled with the door body 10 and thereby reinforce the door body 10.

At the door assembling step 600, the door reinforcing body 20 manufactured at the reinforcement manufacturing step 500 is assembled with the door body 10.

The door body 10 is made of metal having high heat conductivity, namely, copper material. Hence, when the door body moves up and down, the door body may be deformed or damaged by external shocks.

The door main body 5 includes the door body 10 that is in direct contact with the slag and controls the discharge of the slag, and the door reinforcing body 20 that is coupled to the door body 10 to reinforce the door body 10, thus preventing thermal deformation due to high temperature of the slag, and ensuring rigidity sufficient for vertical movement, thus enabling stable operation.

The door reinforcing body 20 is coupled with the door body 10 to surround the lower surface of the door body 10, the outer surface of each guide protrusion 11, and the upper end of each guide protrusion 11, thus reinforcing the door body 10.

As an example, the door reinforcing body 20 includes a base mounting plate 21, a lower support protrusion 22, guide mounting plates 23, and guide support protrusions 24. A rear surface of the door body 10 is mounted to the base mounting plate 21. The lower support protrusion 22 protrudes from a lower portion of the base mounting plate 21 in such a way as to support the lower portion of the door body 10. The guide mounting plates 23 protrude upwards from the base mounting plate 21 in such a way as to be spaced apart from each other, with rear surfaces of the guide protrusions 11 mounted to the guide mounting plates. The guide support protrusions 24 protrude from the guide mounting plates 23, respectively, to support the upper portions of the guide protrusions 11. The door reinforcing body is manufactured by casting using a steel material of high strength.

A stepped portion 12 protrudes from the rear surface of the door body 10 in such a way as to be exposed through the base mounting plate 21 of the door reinforcing body 20. The stepped portion 12 includes a first stepped portion 12a that is provided on an upper portion of the door body 10, and second stepped portions 12b that extend from both ends of the first stepped portion 12a to the front surface of the guide protrusion 11.

The stepped portion 12 is the slag contact surface that is in contact with the slag 2 flowing down along the rear surface of the door body 10 when opening or closing the slag discharge opening 1a.

At the body forming step 100, the stepped portion 12 is formed on the rear surface of the door body 10.

When the slag 2 is discharged through the slag discharge opening 1a, the slag may flow down along the rear surface of the door body 10 and come into contact with the door body. Hence, as described above, the stepped portion 12 is preferably formed on the rear surface of the door body 10 in such a way as to be exposed through the base mounting plate 21 of the door reinforcing body 20.

In the method of manufacturing the slag discharge door according to the present invention, a bolt through hole 20a is formed in the door reinforcing body 20 to permit a bolt to pass therethrough. A fastening hole is formed in the door body 10 in such a way as to correspond to the bolt through hole 20a. Thereby, the door body 10 and the door reinforcing body 20 are assembled with each other using bolts.

The bolt through hole 20a may be formed at the reinforcement manufacturing step 500, and the fastening hole may be formed at the body forming step 100. Alternatively, the bolt through hole 20a and the fastening hole 10a may be formed at the door assembling step 600.

The door body 10 is integrally coupled with the door reinforcing body 20 via the plurality of bolts that pass through the plurality of bolt through holes 20a formed in the base mounting plate 21 and the guide mounting plate 23 to be fastened to the door reinforcing body 20, thus forming the door main body 5.

As described above, the present invention provides a method of manufacturing a slag discharge door, which enables the slag discharge door, namely, a door main body 5 to effectively dissipate heat from slag in the case of blocking the leakage of slag, thus minimizing deformation and damage due to the heat and thereby ensuring good durability and long service life, therefore allowing the slag discharge door to be stably used for a lengthy period of time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a slag discharge door in an electric furnace that has a molten-steel discharge opening to discharge molten steel, the method comprising:

forming a slag discharge opening in the electric furnace separate from the molten-steel discharge opening;

forming a door body of the slag discharge door;

forming a coolant passageway, a coolant inlet, and a coolant outlet by drilling into the formed door body; and closing an open portion of the formed coolant passageway, wherein the open portion is open to an exterior of the door body, wherein the coolant passageway includes:
- a coolant inflow pipe into which coolant is introduced;
- a plurality of coolant branch pipes spaced apart from each other and connected to the coolant inflow pipe to allow the coolant fed from the coolant inflow pipe to pass therethrough; and
- a coolant discharge pipe connected to an outlet of each of the coolant branch pipes, wherein the door body is formed with guide protrusions that protrude from both side of an upper portion of the door body, and wherein forming the coolant passageway includes:
- forming a lower horizontal inflow pipe horizontally disposed on a lower portion of the door body and an upper horizontal discharge pipe horizontally disposed on the upper portion of the door body, by horizontally drilling a side of the door body;
- inserting a side stopper into a portion of each of the lower horizontal inflow pipe and the upper horizontal discharge pipe, wherein the side stopper is open to a side of the door body to block the open portion;
- forming a first side vertical discharge pipe and a second side vertical discharge pipe to form a second passageway by downwardly drilling an upper surface of each of the guide protrusions and connecting the first and second side vertical discharge pipes at an upper end of the guide protrusion, wherein the first side vertical discharge pipe is disposed vertically and connected at a lower end thereof to the upper horizontal discharge pipe, the second side vertical discharge pipe is vertically disposed in the guide protrusion to be spaced apart from the first side vertical discharge pipe and passing through the side stopper of the upper horizontal discharge pipe to allow a lower end thereof to extend to the lower horizontal inflow pipe;
- forming the coolant outlet and the coolant inlet by upwardly drilling a lower surface of the door body, wherein the coolant outlet communicates with the second side vertical discharge pipe and the coolant inlet communicates with the lower horizontal inflow pipe; and
- forming a plurality of vertical branch pipes to be spaced apart, by upwardly drilling the lower surface of the door body, wherein each of the vertical branch pipes passes through the lower horizontal inflow pipe and is connected at an upper end thereof to the upper horizontal discharge pipe.

2. The method as set forth in claim 1, wherein, the door body is formed by forging.

3. The method as set forth in claim 1, wherein a pair of coolant passageways each having the coolant inlet and the coolant outlet are formed on both sides of the door body.

4. The method as set forth in claim 1, wherein in forming the second passageway, the second side vertical discharge pipe is formed through the side stopper of the upper horizontal discharge pipe.

5. The method as set forth in claim 1, further comprising:
forming a high-hardness coating layer on a slag contact surface of the door body with which the slag is in contact.

6. The method as set forth in claim 5, further comprising:
forming the high-hardness coating layer on the slag contact surface of the door body, by welding; and
grinding the high-hardness coating layer formed at the welding coating operation.

7. The method as set forth in claim 5, wherein the high-hardness coating layer is formed on the slag contact surface of the door body by metalizing or plating.

8. The method as set forth in claim 1, further comprising:
forming a door reinforcing body coupled to the door body to reinforce the door body; and assembling the door reinforcing body with the door body.

* * * * *